United States Patent [19]

Vaders

[11] Patent Number: 5,346,328
[45] Date of Patent: Sep. 13, 1994

[54] PRESS DIE CLAMP

[75] Inventor: Dennis H. Vaders, Elkin, N.C.

[73] Assignee: Masonite Corporation, Chicago, Ill.

[21] Appl. No.: 129,875

[22] Filed: Sep. 28, 1993

Related U.S. Application Data

[63] Continuation of Ser. No. 880,703, May 8, 1992, abandoned.

[51] Int. Cl.⁵ .............................. F16B 1/00; F16B 4/00
[52] U.S. Cl. ..................................... 403/374; 403/373; 403/409.1; 403/196; 425/185; 249/167; 249/219.1
[58] Field of Search ...................... 403/373, 374, 409.1, 403/396, 24, 25, 196, 198; 425/185; 249/167, 219.1; 24/457, 458, 459; 292/256.5, 256.71, 256.73

[56] References Cited

U.S. PATENT DOCUMENTS

| | | | |
|---|---|---|---|
| 255,974 | 4/1882 | Hamlin | 292/256.73 |
| 1,019,343 | 3/1912 | Moore et al. | 292/256.5 |
| 1,924,027 | 8/1933 | Clark | 292/256.73 |
| 2,240,660 | 5/1941 | Meakin . | |
| 2,393,078 | 1/1946 | Wager | 292/256.71 |
| 2,603,380 | 7/1952 | Hornbostel | 292/256.73 |
| 3,195,186 | 7/1965 | Gauban et al. . | |
| 3,525,495 | 8/1970 | Brosseau | 249/219.1 |
| 3,995,685 | 12/1976 | Stanko | 164/386 |
| 4,093,176 | 6/1978 | Contastin | 249/167 |
| 4,344,601 | 8/1982 | Fink et al. | 249/167 |
| 4,500,275 | 2/1985 | Ruhl | 425/185 |
| 4,743,054 | 5/1988 | Lavalerie . | |
| 5,108,216 | 4/1992 | Geyer | 403/409.1 |
| 5,136,760 | 8/1992 | Sano | 403/409.1 |

FOREIGN PATENT DOCUMENTS

| | | |
|---|---|---|
| 213024 | 3/1987 | European Pat. Off. . |
| 873473 | 4/1953 | Fed. Rep. of Germany ........................ 292/256.71 |
| 4029957 | 3/1992 | Fed. Rep. of Germany . |
| 1400227 | 4/1965 | France . |
| 2082945 | 3/1982 | United Kingdom . |
| 2158753 | 11/1985 | United Kingdom . |

Primary Examiner—Randolph A. Reese
Assistant Examiner—Anthony Knight
Attorney, Agent, or Firm—Marshall, O'Toole, Gerstein, Murray & Borun

[57] ABSTRACT

An apparatus for clamping first and second separable components comprising a support member having an inclined surface fixed to the first component, a mounting stud fixed to the support member and extending therefrom, and a clamping member slidably mounted on the stud and movable between a clamping position and a detached position is provided. The clamping member is adapted to frictionally engage both the second component and the inclined surface of the support member when in a clamping position and to retain the first component adjacent to the second component during thermal expansion of the second component.

23 Claims, 1 Drawing Sheet

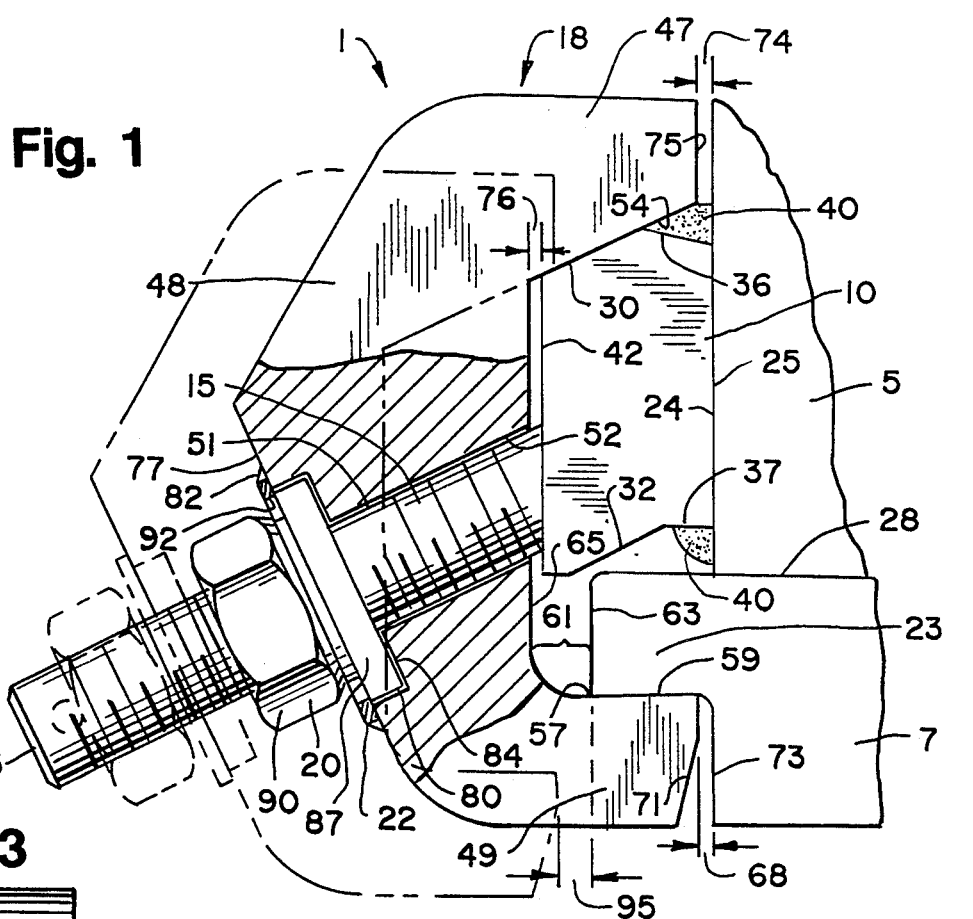
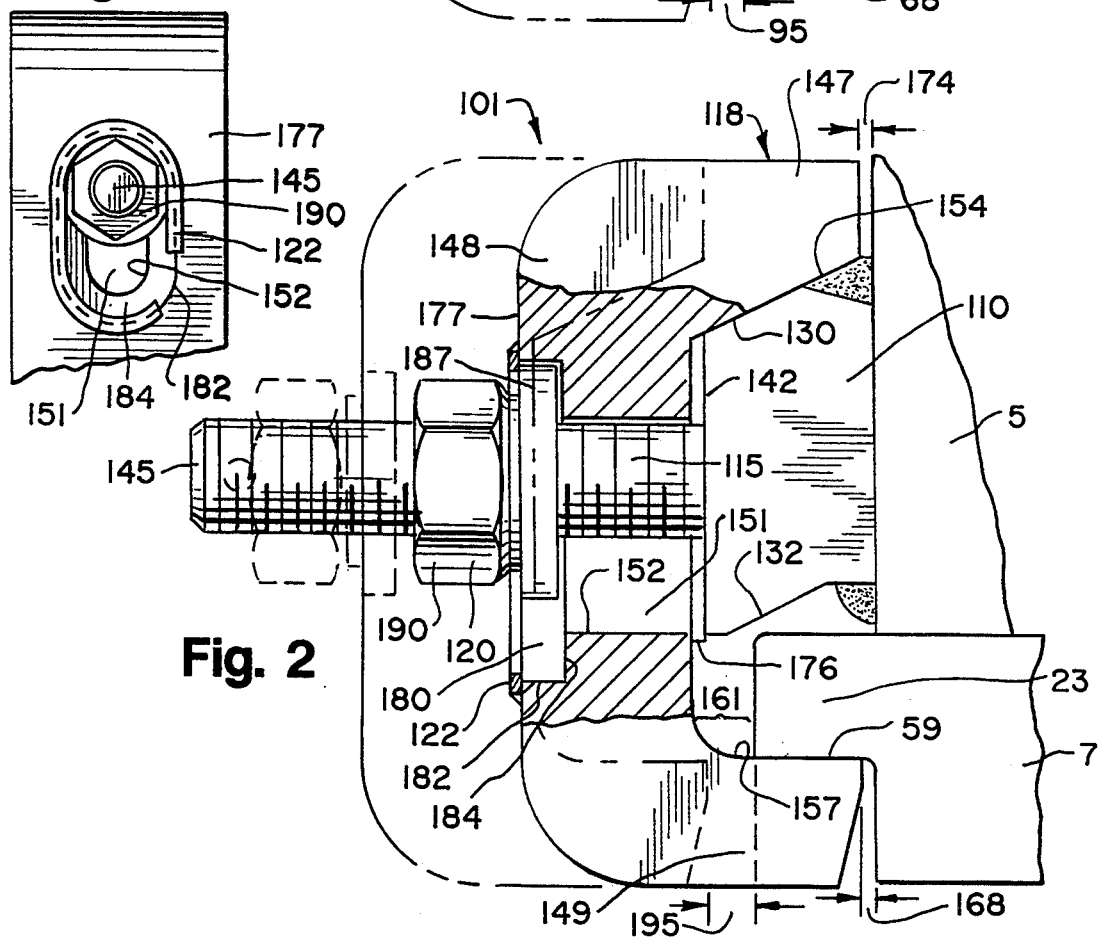

PRESS DIE CLAMP

This is a continuation of U.S. application Ser. No. 07/880,703, filed May 8, 1992 now abandoned.

BACKGROUND OF THE INVENTION

1. Field of the Invention

This invention relates generally to clamping mechanisms and, more particularly, the invention relates to devices for clamping a die to a heated platen in a frame-type press.

2. Description of Related Technology

In the manufacture of board products such as hardboard and fiberboard, embossing dies utilized for the board-forming process are typically clamped or otherwise attached to heated platens of a frame-type press. Embossing dies are typically of either one-piece construction or are welded to a carrier plate. Such dies or die and plate combinations may weigh up to 20,000 pounds and have dimensions of up to about 10 feet by 25 feet. The platens may be heated to temperatures greater than 400° F. When a die is subjected to such temperatures, it may undergo considerable thermal expansion, resulting in difficulties in clamping the die to the platen.

A prior known clamping system for attaching a die to a platen includes a plurality of fasteners, spaced about the perimeter of the die and platen, each including a pair of matching slotted ears, a bolt and a nut. One of the slotted ears of each fastener is welded to the platen and the matching slotted ear is welded to the die. The bolt shank is passed through the pair of slotted ears until the bolt head abuts one of the ears and the nut is screwed onto the bolt threads until it abuts against the other ear, thereby securing the die to the platen.

A disadvantage of the fasteners described in the previous paragraph is that initially, the bolts cannot be utilized to attach a cool die to a heated platen because the slotted ears are not in alignment. Temporary fasteners are required to connect additional pairs of slotted ears as the die expands due to heat from the adjacent platen. After full thermal expansion, the temporary fasteners are replaced by the bolts and nuts described above. A further disadvantage of this clamping system is that the bolts and nuts must be installed by hand near the hot platen.

SUMMARY OF THE INVENTION

It is an object of the invention to overcome one or more of the problems described above.

According to the invention, an apparatus is provided for clamping first and second separable components such as, for example, a platen and a die or a platen and a carrier plate/die combination. The apparatus comprises a support member adapted to be fixed to the first component, a mounting member or stud fixed to the support member and extending therefrom, and a clamping member slidably mounted on the stud and movable between a clamping position and a detached position. An operator may adjust the position of the clamping member using a socket wrench on a long extension, thereby distancing the operator from the first component, which in the case of a platen, may be dangerously hot.

The clamping member is adapted to frictionally engage both the second component and the support member when in a clamping position. Furthermore, the clamping member is adapted to retain the first component adjacent to the second component during thermal expansion of the second component. Also, separation of the two components may be accomplished without removal of the clamping member from the stud by simply placing the clamping member in the detached position.

Other objects and advantages of the invention will be apparent to those skilled in the art and from the following detailed description, taken in conjunction with the drawings and the appended claims.

BRIEF DESCRIPTION OF THE DRAWINGS

FIG. 1 is a side elevational view, partially in section, of a clamping apparatus according to the invention shown in a clamping position in solid lines and a detached position in phantom lines.

FIG. 2 is a side elevational view, partially in section, of a second embodiment of a clamping apparatus according to the invention and shown in a clamping position in solid lines and a detached position in phantom lines.

FIG. 3 is a reduced and fragmentary elevational view of the second embodiment with portions removed to show the detail thereof.

DETAILED DESCRIPTION OF THE INVENTION

FIG. 1 illustrates a clamping apparatus of the invention, generally designated 1, for clamping first and second separable components illustrated by a platen 5 and a die 7, respectively. The apparatus 1 generally includes a support member in the form of a block 10, a mounting member in the form of a threaded stud 15, a generally C-shaped clamping member 18, a retaining member in the form of a flanged nut 20, and a retaining washer 22. A plurality of clamping apparatus 1 are positioned about the periphery of the platen 5 and the die 7 for securing the die 7 at a lip or shoulder 23 thereof in a position adjacent to the platen 5.

The platen 5 and die 7 shown in FIG. 1 are an upper component of a press (not shown) and die set that would include a lower platen (not shown) and a lower die (not shown) which would also be attached by a plurality of clamping apparatus 1. The clamping apparatus 1 also may be utilized with a die and attached carrier plate combination (not shown) wherein a die would be fixed to a carrier plate and the plate would include a lip or shoulder similar to the lip 23 for securing the die/carrier plate assembly to a position adjacent to the platen 5.

The block 10 is welded or otherwise fixed at a surface 24 to a vertical outer surface 25 of the platen 5 near a lower edge 28 thereof. To clamp a die 7 having dimensions of about 10×25 ft., support blocks 10 (and connected components 15, 18, 20 and 22 of the clamping apparatus 1) are preferably positioned about the periphery of the platen 5 in spaced relation about every 17 inches. However, more or fewer blocks 10 may be required depending upon the size and weight of the die 7. The size of the block 10 (and the other components of the clamping apparatus 1) may vary with the size and weight of the die 7.

The block 10 has an upper inclined or sloping surface 30 and a lower inclined surface 32. The incline of surface 30 may range from about 15° to about 35° with respect to the horizontal and is preferably about 25° with respect to the horizontal and slopes in a downward direction away from the upper platen 5 for use in clamping a top die 7 as illustrated by FIG. 1. If being used for attaching a lower die (not shown) to a lower platen (not shown), the surface 30 would slope in an upward direction away from a lower platen when attached thereto. The lower surface 32 is illustrated generally parallel to the upper inclined surface 30 however, this is not required. The surface 32 need only be oriented so as to be spaced from the surface of the shoulder 23 of the die 7 when the apparatus 1 is clamping the die 7 to the platen 5.

The block 10 also includes upper and lower welding ledges 36 and 37, respectively, located near the surface 24 providing a generally horizontal or slightly inclined surface for a weld 40 or other attachment means that does not interfere with the clamp 18 or the die 7. The width of the welding ledges 36 and 37 are determined by the size of the block 10 and the weight of the die 7, and are preferably at least 10 mm wide for use with the 10×25 ft. die described above.

The block 10 may be made from alloy steel or other materials that can withstand the high temperatures reached by the platen 5.

The block 10 further includes a generally cylindrical bore or aperture (not shown) having an opening at a generally vertical surface 42 and near the lower edge 32. The bore is tapped or otherwise adapted to engage the mounting stud 15 and has a central axis generally parallel to the surface 30 and is otherwise located generally centrally within the block 10.

The mounting member or threaded stud 15 is screwed or otherwise fixed at a threaded end (not shown) into the bore (not shown) of the block 10 and extends outwardly from the surface 42. Thus, the stud 15 is positioned generally parallel to the upper inclined surface 30 of the block 10. The stud 15 is also threaded between an outer end 45 and a generally central location therealong with the threads adapted for engagement with the inner threads of the nut 20.

The stud 15 is made from a strong material, preferably of an alloy steel such as stainless steel.

The generally C-shaped clamping member 18 includes an upper leg 47, a mid-section 48, and a lower leg 49 and has a bore or aperture 51 extending through the mid-section 48. A surface 52 of the bore 51 is adapted to slidably receive and surround the stud 15 as a sleeve. The bore 51 is angularly oriented in the clamping member 18 in a direction parallel to a surface 54 of the upper leg 47, thereby orienting the surface 54 parallel to the block surface 30 when the clamping member 18 is slidably mounted on the stud 15 with the stud 15 surrounded by the surface 52 of the bore 51. The surface 54 of the upper leg 47 engages the surface 30 of the block 10 when the apparatus 1 is in a clamping position as shown in solid lines in FIG. 1.

The clamping member 18 is made from alloy steel or other strong, heat resistant material.

The lower leg 49 of the clamping member 18 includes an upper face or surface 57 that is adapted to be positioned generally horizontally when the stud 15 is surrounded by the surface 52 of the bore 51. The upper surface 57 engages a lower surface 59 of the lip 23 of the die 7 when the apparatus 1 is in a clamping position as shown in solid lines in FIG. 1. Because both the upper surface 57 of the clamping member 18 and the lower surface 59 of the lip 23 are generally parallel in orientation, the surface 59 may slide easily with respect to the surface 57 as the die 7 expands or contracts during heating or cooling.

The lower leg 49 and mid-section 48 of the clamping member 18 are designed to provide a gap, illustrated by reference numeral 61 in FIG. 1, between an outer edge 63 of the lip 23 of the die 7 and a facing surface 65 of the mid-section 48 when the apparatus 1 is in a clamping position. The gap 61 provides space for thermal expansion of the die 7 and adjustment of the clamping member 18 as the die 7 is heated by the platen 5.

The lower leg 49 of the clamping member 18 is also designed to provide a gap illustrated by reference numeral 68 in FIG. 1 located beneath the lip 23 and between a surface 71 of the lower leg 49 and a surface 73 of the die 7 when the apparatus 1 is in a clamping position. The gap 68 also provides space for adjustment of the apparatus 1 due to thermal expansion of the die 7 and wear or other thickness variation of the lip 23.

The upper leg 47 of the clamping member 18 is also designed to provide a gap illustrated by reference numeral 74 in FIG. 1 located between a surface 75 of the leg 47 and surface 25 of the platen 5. The gap 74 also provides space for adjustment of the apparatus 1 due to thermal expansion of the die 7.

An additional gap 76 also providing space for adjustment of the apparatus 1 due to thermal expansion of the die 7 is located between the surface 65 of the mid-section 48 of the clamp 18 and the surface 42 of the block 10. Each of the gaps 61, 68, 74 and 76 also compensates for a decrease in the thickness of the lip 23 due to wear which might otherwise result in the clamping member 18 abutting the vertical surfaces of the block 10, platen 5 or die 7 resulting in a failure of the apparatus 1 to adequately secure the die 7 to the platen 5.

An outer surface 77 of the mid-section 48 of the clamping member 18 is generally oriented perpendicularly to the bore 51. The mid-section 48 has a generally shallow cylindrical recess 80 located near the surface 77 and concentric with the bore 51. The diameter of the recess 80 is larger than the diameter of the bore 51. A cylindrical wall 82 and a flat surface 84 define the boundary of the recess 80. The flat surface 84 is parallel to the surface 77.

The wall 82 and surface 84 of the recess 80 sleeve a flange portion 87 of the flanged nut 20. The flange portion 87 is integral or fixed to a head portion 90 located outside of the recess 80. The threaded nut 20 is mounted on the stud 15 and held adjacent to the clamping member 18 by the washer 22.

The generally circular, flat washer 22 is welded or otherwise fixed to surface 77 of the midsection 48. The washer 22 includes an inner edge 92 that overhangs the cylindrical wall 82 of the recess 80 thereby partially covering the recess 80. The inner edge 92 is generally circular in shape and has a diameter that is smaller than the outer diameter of the flange portion 87 of the nut 20, thereby containing or restraining the flange portion 87 within the recess 80. The flange portion 87 is loosely held within the recess 80 thereby allowing the retaining member 20 to be freely rotatable with respect to the clamping member 18. The inner edge 92 may also be a shape other than circular and is preferably hexagonal or square, providing for greater bearing area against the flange portion 87.

The washer 22 is preferably made from a cold drawn steel or other strong material.

As explained above, the clamping apparatus 1 is shown with an upper platen 5 and upper die 7 in FIG. 1. The apparatus 1 may also be utilized with a lower platen and lower die by placing it in an inverted position (i.e. upside down) from the orientation shown in FIG. 1.

In use, a plurality of blocks 10 are initially welded or otherwise fixed to a platen 5 of a frame-type press (not shown). A stud 15 is mounted on each block 10 and a clamping member 18 with a connected flanged nut 20 is mounted on the stud 15 near the end 45 (the detached position shown in FIG. 1 in phantom lines). The die 7 is lifted (or lowered) into the proximity of the platen 5 and clears the clamping apparatus 1 by way of a clearance or gap illustrated by the reference numeral 95 shown in FIG. 1. An operator may use a socket wrench with a long extension to rotate the head portion 90 of the nut 20 and thereby slide the clamping member 18 toward the heated platen 5 until the surface 54 of the clamping member 18 frictionally engages the inclined surface 30 of the block 10 and the lower leg surface 57 frictionally engages the surface 59 of the die 7 as shown in solid lines in FIG. 1. The socket wrench may be used to rotate the retaining nut 20 to the left or to the right and thereby move the clamping member 18 to any chosen position along the mounting stud 15, generally between the detached position shown in phantom lines and the clamping position shown in solid lines in FIG. 1.

The clamping process using the apparatus 1 takes only a short amount of time and all parts are contained on the stud 15 (i.e. no loose parts fall off and cause damage to the press).

The die 7 is initially clamped loosely to the platen 5 to allow for expansion of the die upon heating. Because the die 7 is generally long and flat, most the heat expansion and contraction occur in a horizontal or lengthwise direction. The die surface 59 therefore easily slides in a horizontal direction with respect to the clamp surface 57 when clamped loosely by the apparatus 1. Thus, no temporary fasteners are required. As the die 7 is heated by the platen 5, the die 7 may expand horizontally into the gap areas 61, 68, 74 and 76. Also, thermal expansion of the die 7 in the vertical direction and wear or other thickness variation of the lip 23 causes the clamping member 18 to slide along the inclined surface 30 of the block 10.

If the expansion of the die 7 requires adjustment of the clamping member 18, an operator may simply adjust the position of the member 18 by turning the nut 20 while being at a safe distance from the heated platen 5 and die 7, using a socket wrench on a long extension. With a simple adjustment of the nut 20, the clamping member 18 slides either vertically and toward the platen 5 or vertically and away from the platen 5 along the inclined surface 30.

After the die 7 is heated and ceases to expand, each of the clamping apparatus 1 is tightened.

When an operator desires to separate the die 7 from the platen 5, the socket on a long extension is used to engage the nut head 90, rotate the nut 20 and thereby slide the connected clamping member 18 outwardly away from the ramp block 10 and the die 7 to the detached position shown in phantom lines in FIG. 1.

FIGS. 2 and 3 illustrate a second embodiment of a clamping apparatus according to the invention, generally designated by the reference numeral 101 for clamping first and second separable components illustrated by a platen 5 and a die 7 respectively. The apparatus 101 generally includes a support member or block 110, a mounting member or threaded stud 115, a generally C-shaped clamping member 118, a retaining member or flanged nut 120 and a flat and oblong retaining washer 122, made of materials and adapted to cooperate with each other and with the platen 5 and a die 7 similar to the support block 10, threaded stud 15, clamping member 18, flanged nut 20 and retaining washer 22 of the apparatus 1 shown in FIG. 1.

The apparatus 101 differs from the apparatus 1 with respect to the orientation of a bore in the block 110, the orientation of the stud 115 and the configuration of the washer 122 and some of the elements or features of the clamping member 118. As with the apparatus 1, a plurality of clamping apparatus 101 are positioned about the periphery of the plate 5 and die 7 for securing the die 7 at a lip or shoulder 23 thereof in a position adjacent to the platen 5.

The block 110 has upper and lower inclined or sloping surfaces 130 and 132 respectively, similar to surfaces 30 and 32 of the block 10 of apparatus 1. The block 110 also includes a bore (not shown) that is oriented generally horizontally when the block 110 is fixed to the platen 5. Thus, the stud 115 when fixed into the bore is also positioned generally horizontally and is perpendicular to a surface 142 of the support block 110. The stud 115 is threaded between an outer end 145 and a generally central location therealong with the threads adapted for engagement with the inner threads of the nut 120.

The generally C-shaped clamping member 118 includes an upper leg 147, mid-section 148 and lower leg 149 and has s lot 151 extending through the mid-section 148. A surface 152 of the slot 151 is adapted for slidably surrounding the stud 115. The slot 151 is slightly wider than the diameter of the stud 115 with respect to the horizontal. With respect to the vertical, the slot 15, is of a length that provides for adequate movement of the clamping member 118 in a vertical direction corresponding to the extent of vertical thermal expansion of the die 7, thereby allowing for vertical adjustment of the clamping member 118 when the apparatus 1 is in a clamping position with a surface 154 of the clamping member 118 frictionally engaging the surface 130 of the support block 110 as shown in solid lines in FIG. 2.

The lower leg 149 of the clamping member 118 includes an upper face or surface 157 that is adapted to be positioned generally horizontally when the stud 115 is surrounded by the surface 152 of the slot 151. The upper surface 157 engages the lower surface 59 of the lip 23 of the die 7 when the apparatus 1 is in a clamping position as shown in solid lines in FIG. 2.

The legs 147 and 149 and mid-section 148 of the clamping member 118 are designed to provide gaps, illustrated by reference numerals 161, 168, 174 and 176 in FIG. 2 similar in orientation and function to the gaps 61, 68, 74 and 76 respectively described with respect to apparatus 1.

An outer surface 177 of the mid-section 148 of the clamping member 118 is generally oriented vertically and perpendicularly to the slot 151. The mid-section 148 has a generally shallow, oblong recess 180 located near the surface 177. The width and length of the recess 180 are slightly larger than the width and length respectively of the slot 151. A wall 182 and a flat surface 184 define the boundary of the recess 180. The flat surface 184 is parallel to the surface 177.

The oblong, flat washer 122 is fixed to the surface 177 in a manner and orientation similar to what is described above with respect to the washer 22 and surface 77 of apparatus 1. The washer 122 and the wall 182 and the surface 184 of the recess 180 loosely contain and constrain a flange portion 187 of the flanged nut 120 with the washer 122 partially covering the recess 180. The flange portion 187 is integral or fixed to a head portion 190 located outside of the recess 180. The head portion 190 is therefore freely rotatable with respect to the clamping member 118. The combination of the threaded nut 120 and the clamping member 118 is mounted on the stud 115.

In use, a plurality of blocks 110 are initially welded or otherwise fixed to a platen 5 of a frame-type press (not shown). A stud 115 is mounted on each block 110 and a clamping member 118 with a connected flanged nut 120 is mounted on the stud 115 near the end 145 (the detached position as shown in phantom lines in FIG. 2). The die 7 is lifted into the proximity of the platen 5 and clears the clamping apparatus 101 by way of a clearance or gap illustrated by the reference numeral 195 shown in FIG. 2. An operator may use a socket wrench with a long extension to rotate the nut head 190 and thereby slide the clamping member 118 toward the heated platen 5 until the surface 154 of the clamping member 118 frictionally engages with the inclined surface 130 of the block 110 and the lower leg surface 157 frictionally engages the surface 59 of the die 7 as shown in solid lines in FIG. 2. The socket wrench may be used to rotate the retaining nut 120 to the left or to the right and thereby move the clamping member 118 to any chosen position along the mounting stud 115, generally between the detached position shown in phantom lines and the clamping position shown in solid lines in FIG. 2.

The clamping process using the apparatus shown in FIG. 2 takes only a short amount of time and all parts are contained on the stud 115 (i.e. no loose parts falling off and causing damage to the press).

The die 7 is initially clamped loosely to the platen 5 to allow for expansion of the die upon heating. Because the die 7 is generally long and flat, most of the heat expansion and contraction occur in a horizontal or lengthwise direction. As the die 7 is heated by the platen 5, the die 7 may expand horizontally into the gap areas 161, 168, 174 and 176 and slide horizontally with respect to the surface 157. Thus, no temporary fasteners are required. Also, thermal expansion of the die 7 in the vertical direction and wear or other thickness variation of the lip 23 causes the clamping member 118 to slide along the inclined surface 130 of the block 10 with the clamping member 118 being adjustable in a vertical direction within the slot 151.

If the expansion of the die 7 requires adjustment of the clamping member 118, an operator may simply adjust the position of the clamping member 118 by turning the nut 120 while being at a safe distance from the heated platen 5 and die 7 by using a socket wrench on a long extension.

After the die 7 is heated and ceases to expand, each of the clamping apparatus 101 is tightened.

When an operator desires to separate the die 7 from the platen 5, the socket on a long extension is used to engage the nut head 190, rotate the nut 120 and thereby slide the connected clamping member 118 outwardly away from the ramp block 110 and the die 7 to the detached position shown in phantom lines in FIG. 2.

The foregoing detailed description is given for clearness of understanding only, and no unnecessary limitations are to be understood therefrom, as modifications within the scope of the invention will be obvious to those skilled in the art.

I claim:

1. An apparatus for clamping together first and second separable components comprising
   (a) a support member having an inclined surface and being adapted to be fixed to the first component,
   (b) a mounting member fixed to said support member and extending therefrom, and
   (c) a clamping member slidably mounted on said mounting member and movable between a clamping position and a detached position thereon, said clamping member having first and second legs, said first leg having a first surface being adapted to frictionally engage the second component and said second leg having a second surface being adapted to frictionally engage the support member along said inclined surface when in said clamping position, said first and second legs retaining the first component adjacent to the second component during thermal expansion of the components while in said clamping position, said clamping member being disengagable from both said first and second components when in said detached position.

2. An apparatus according to claim 1 wherein said mounting member is a threaded stud.

3. An apparatus according to claim 1 including a retaining member mounted on said mounting member, said retaining member being connected to said clamping member and adapted to retain said clamping member on said mounting member in a selected position including said clamping position and said detached position and positions therebetween, said retaining member being freely rotatable with respect to said clamping member.

4. An apparatus according to claim 3 wherein said clamping member is generally C-shaped and defines a recess.

5. An apparatus according to claim 4 wherein said retaining member is a nut having a head portion and a flange portion, said flange portion being loosely constrained in said recess.

6. An apparatus according to claim 5 comprising a washer fixed to said clamping member and partially covering said recess, said washer being adapted to retain said flange portion loosely within said recess.

7. An apparatus according to claim 1 wherein said mounting member extends from said support member in a direction parallel to said inclined surface.

8. An apparatus according to claim 1 wherein said clamping member has a face adapted to frictionally engage said second component, said face being generally parallel to the major direction of thermal expansion and contraction of the second component.

9. An apparatus according to claim 1 wherein said clamping member is generally C-shaped defined at least in part by the first and second legs.

10. An apparatus for clamping together first and second separable components comprising
    (a) a support member adapted to be fixed to the first component, said member defining an inclined surface and a generally vertical surface,
    (b) a mounting member fixed to said support member and extending from said vertical surface in a direction parallel to said inclined surface,
    (c) a clamping member slidably mounted on said mounting member and movable between a clamping position and a detached position thereon, said clamping member adapted to frictionally engage the second component and frictionally engage said support member along said inclined surface when in said clamping position, wherein said clamping member being adapted to retain the first component adjacent to the second component during thermal expansion of the components while in said clamping position, said clamping member being disengagable from both said first and second components when in said detached position, and (d) a retaining member mounted on said mounting member, said retaining member being connected to said clamping member and adapted to retain said clamping member on said mounting member, said retaining member being freely rotatable with respect to said clamping member.

11. An apparatus according to claim 10 wherein said mounting member is a threaded stud.

12. An apparatus according to claim 11 wherein said clamping member is generally C-shaped and has an aperture and a recess, said aperture being adapted to slidably receive said stud and said recess being adapted to receive said retaining member.

13. An apparatus according to claim 12 wherein said retaining member is a nut having a head portion and a flange portion, said flange portion being loosely constrained in said recess.

14. An apparatus according to claim 13 comprising a washer fixed to said clamping member and partially covering said recess, said washer being adapted to retain said flange portion within said recess.

15. An apparatus according to claim 10 wherein said clamping member is generally C-shaped and has an upper leg and a lower leg, said lower leg defining a face adapted to be generally parallel to the major direction of thermal expansion and contraction of the second component, said upper leg being adapted to frictionally engage said inclined surface and said face of said lower leg being adapted to frictionally engage the second component.

16. An apparatus according to claim 10 wherein said mounting member extends in a direction generally perpendicular to said vertical surface.

17. An apparatus according to claim 16 wherein said clamping member is generally C-shaped and defines a slot and a recess, said slot extending in a generally vertical direction and being adapted to slidably receive said mounting member.

18. An apparatus according to claim 17 wherein said retaining member is a nut defining a head portion and a flange portion, said flange portion being loosely constrained in said recess.

19. An apparatus according to claim 18 comprising an oblong washer fixed to said clamping member and partially covering said recess, said washer being adapted to retain said flange portion within said recess.

20. An apparatus for clamping a heated platen of a frame-type press to a flat surface of an embossing die comprising (a) a support block adapted to be fixed to the platen, said block having an inclined surface and a generally vertical surface, (b) a threaded mounting stud fixed to said support block and extending therefrom, (c) a generally C-shaped clamping member slidably mounted on said mounting stud and movable between a clamping position and a detached position thereon, said clamping member having an upper leg, a lower leg, an aperture and a recess, said lower leg defining a face generally oriented parallel to the flat face of the embossing die, said aperture being adapted to receive said stud, said upper leg being adapted to frictionally engage said inclined surface and said lower leg being adapted to frictionally engage the die when in said clamping position and wherein said clamping member is adapted to retain the die adjacent to the platen during thermal expansion and contraction of the die while in said clamping position, said clamping member being disengagable from both the platen and the die when in said detached position, (d) a retaining nut mounted on said mounting stud, said retaining nut being connected to said clamping member and adapted to retain said clamping member on said mounting stud, said retaining nut being freely rotatable with respect to said clamping member, said nut defining a head portion and a flange portion, and (e) a washer fixed to said clamping member and partially covering said recess, said washer being adapted to retain said flange portion within said recess.

21. An apparatus according to claim 20 wherein said stud is oriented in a direction parallel to said inclined surface.

22. An apparatus according to claim 21 wherein said stud is oriented in a direction perpendicular to said vertical surface.

23. In a clamping system for holding a first component to a lip of a second component, the components having surfaces that extend due to heat expansion, the improvement comprising:

(a) a first member having first and second oppositely disposed faces and an inclined surface, said first member adapted to be fixed to the first component at said first face, (b) a mounting member fixed to the first member and extending outwardly from said second face, (c) means for clamping the first component to the second component slidably mounted on the mounting member, said means having a first sloped surface adapted to frictionally engage said inclined surface and a second surface adapted to frictionally engage the lip of the second component while in spaced relation to the extending surfaces thereof.

* * * * *